March 15, 1966  J. M. BERGEY  3,240,891
INERTIAL SWITCH

Filed April 29, 1963 2 Sheets-Sheet 1

INVENTOR.
JOHN M. BERGEY
BY
*LeBlanc and Shur*
ATTORNEYS

March 15, 1966   J. M. BERGEY   3,240,891
INERTIAL SWITCH
Filed April 29, 1963   2 Sheets-Sheet 2

INVENTOR.
JOHN M. BERGEY
BY
LeBlanc and Shur
ATTORNEYS

United States Patent Office 3,240,891
Patented Mar. 15, 1966

3,240,891
INERTIAL SWITCH
John M. Bergey, Lancaster, Pa., assignor to Hamilton Watch Company, Lancaster, Pa., a corporation of Pennsylvania
Filed Apr. 29, 1963, Ser. No. 276,245
16 Claims. (Cl. 200—61.46)

This invention relates to inertial switches and more particularly to a miniature g-second switch for monitoring acceleration phenomena.

Acceleration responsive g-second switches are not new. The principle of using available acceleration forces to actuate a switch forms the basis of many space vehicle and ordnance endeavors. One of the most common is the utilization of a switch of this type for arming missiles and rockets. As such, the units are normally used to control primers, leads, or other pyro-technics which impart a substantial mechanical load to the sensing device. Furthermore, the prior fuze-type units are not readily adapted to the programming of a series of events through the sequential closing of a plurality of switches.

The present invention provides a novel miniature inertial switch of the g-second type of relatively simplified, rugged construction wherein the switching function involves little or no mechanical loading of the sensing unit. As a result, the switch of the present invention is much more accurate and can be used not only in projectile fuses, but for a wide variety of other acceleration monitoring problems including rocket launch measurements, programming events resulting from boost phenomena and even transportation vibration monitoring. Further important features of the present invention include its small compact size, increased accuracy, and its ready adaptability for operation over a wide range of desired g-second products.

It is, therefore, one object of the present invention to provide a novel inertial switch.

Another object of the present invention is to provide a novel g-second switch of relatively small size and rugged construction particularly suited for use in space vehicle measurements.

Another object of the present invention is to provide a novel vibration monitor.

Another object of the present invention is to provide an inertial switch wherein the sensing element is subjected to a minimum of mechanical load as a result of the switching function.

Another object of the present invention is to provide a g-second switch having substantially increased accuracy and sensitivity.

These and further objects and advantages of the invention will be more apparent upon reference to the following specification, claims and appended drawings wherein:

The inertial switch of the present invention is an escapement governed device which double integrates acceleration in order to provide a distance analog. As such, the device provides a switching function when a finite product of acceleration times time is achieved according to the equation $S = \frac{1}{2}gt^2$ where S is distance, g is acceleration in gravitational units and t stands for time. Since the end product is accomplished by varying either the time or acceleration parameters, a device of this type is often referred to as a g-second device.

The unit of the present invention is particularly suited for use in rocket launch measurements and in programming events resulting from boost phenomena. It is also useful in transportation vibration monitoring where it is desired to determine whether or not the maximum g-second product to which a device being transported by truck, rail, air, or the like has been subjected during handling and shipping exceeds a certain predetermined value. It is, of course, further possible to utilize the g-second switch of the present invention in the more familiar ordnance applications such as rocket arming and other types of missile fuzing situations.

Figure 1:
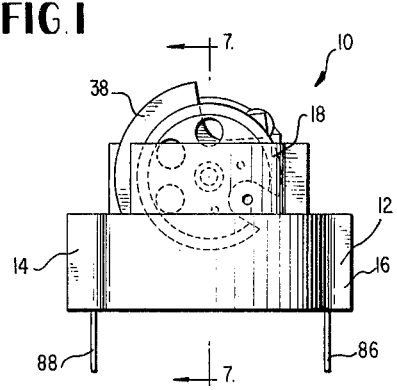
FIGURE 1 is an elevational view of the novel switch of the present invention.
Figure 2:
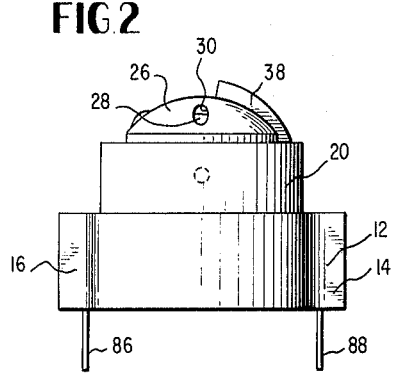
FIGURE 2 is an elevational view taken at 180° to that of FIGURE 1.
Figure 3:
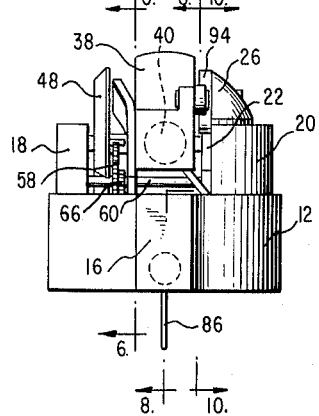
FIGURE 3 is an elevational view taken at 90° with respect to both FIGURES 1 and 2.
Figure 4:
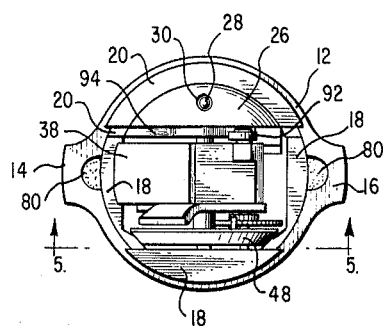
FIGURE 4 is a plan view of the switch illustrated in FIGURE 1.

Referring to the drawings, the switch generally indicated at 10 in FIGURE 1 comprises an outer aluminum ring 12 of annular configuration with the exception of the projections 14 and 16 best seen in FIGURE 4. The ring 12 surrounds a three-piece chassis comprising brass end blocks 18 and 20 and center support plate 22, also made of brass and best seen in cross section in FIGURE 7.

Figure 7:
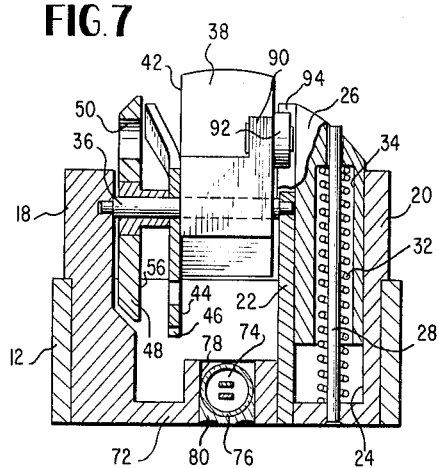
FIGURE 7 is a cross section taken along line 7—7 of FIGURE 1.

End block 20 is provided with an elongated groove or slot 24 which combines with support plate 22 to provide a guideway for a reciprocatable set-back mass 26. Secured at its lower end to the end block 20 is an elongated guide pin 28 which passes upwardly through an aperture 30 in the set-back mass and which is partially surrounded by a coiled compression spring 32. One end of spring 32 bears against the lower end of guideway 24 while its opposite end bears against the end of a tubular re-entrant cavity 34 formed in the set-back mass. Coil spring 32 acts to bias the set-back mass 26 to its uppermost position in guideway 24 as is illustrated in FIGURE 7.

Center chassis plate 22 supports one end of a main stationary shaft 36 on which is rotatably mounted an eccentric weight or rotor 38 preferably formed of brass and rotatable about the shaft 36. Embedded within the rotor 38 is a cylindrical platinum cobalt permanent magnet 40. Secured to one face 42 of the rotor is a sector shaped berillium copper drive rack 44 rigidly attached to the rotor and having gear teeth 46.

Figure 5:
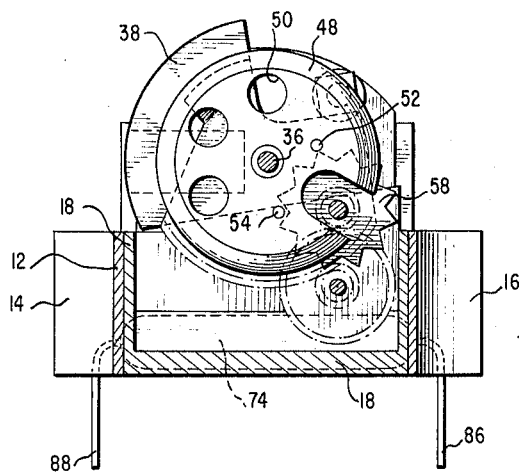
FIGURE 5 is a cross section taken along line 5—5 of FIGURE 4.
Figure 6:
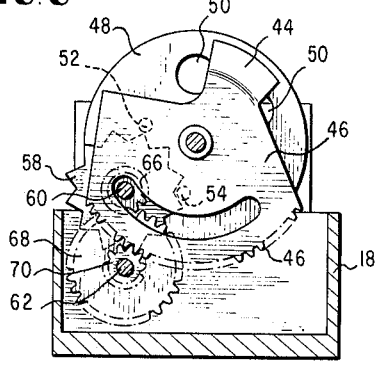
FIGURE 6 is a cross section taken along line 6—6 of FIGURE 3.

Rotor 38 drives a run-away escapement comprising an annodized aluminum pallet 48 having suitable apertures such as 50 to provide proper weight and balance. The pallet 48 is freely mounted for rotation about main shaft 36, the opposite end of which is journalled in the end block 18. Pallet 48 carries a pair of pins such as 52 and 54 illustrated in FIGURE 5 which extend from its in-board surface 56 and which are alternately engaged by the teeth of a brass escape or star wheel 58. Pins 52 and 54 are preferably made of hardened steel.

Also supported by end block 18 and support plate 22 are a further pair of stationary shafts comprising upper shaft 60 and lower shaft 62. Drive rack 44 is provided with a slot 64 curved about the axis of rotation of the rotor 38 which slot provides clearance for the upper shaft 60 as the rotor moves. Shaft 60 rotatably supports star wheel 58 which star wheel is rigidly connected to a drive pinion 66 also mounted on the shaft 60. Lower shaft 62 rotatably supports a brass drive wheel 68 having teeth meshing with the star wheel pinion 66. Drive wheel 68 is in turn rigidly connected to a further pinion 70 having teeth engaging the teeth of the drive rack 46. In this way, rotational movement of rotor 38 acts to drive the star wheel 58 through the gear train and under the control of the run-away escapement comprising pallet 48 and pins 52 and 54.

Figure 10:
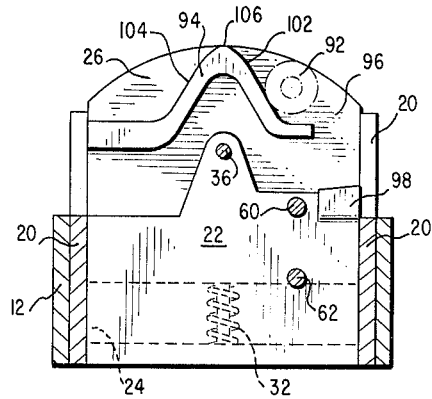
FIGURE 10 is a cross section taken along line 10—10 of FIGURE 3 showing the set-back mass and commit cam in the rest position of FIGURE 8.
Figure 11:
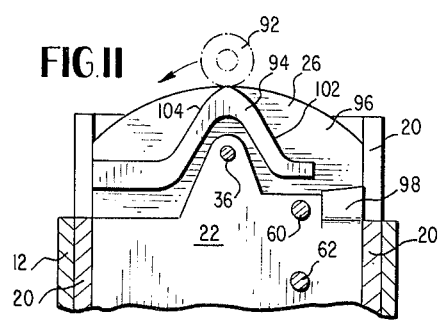
FIGURE 11 is a cross section similar to that of FIGURE 10 showing the switch in the commit position.

End block 18 is provided with a horizontal projection 72 best seen in FIGURE 7 which houses a reed switch 74 of the form A type (normally open). The reed switch comprises a hermetically sealed glass envelope 76 secured in a suitable slot 78 in the end block by epoxy resin indicated at 80 in FIGURE 7. Reed switch 74 includes a pair of cantilever contacts 82 and 84 electrically connected to leads 86 and 88 used to couple the device to the electrical circuit to be controlled. Rotor 38 is provided with a boss 90 best seen in FIGURE 7 which carries a shaft supporting a roller or cam follower 92. As best seen in FIGURES 10 and 11, roller 92, upon rotation of the rotor 38 follows the contour of a curved ledge or cam 94 projecting from the in-board face 96 of the set-back mass 26. A bent over tab 98 formed in support plate 22 acts to limit the rotation of the rotor to the position illustrated in FIGURE 8.

Figure 8:
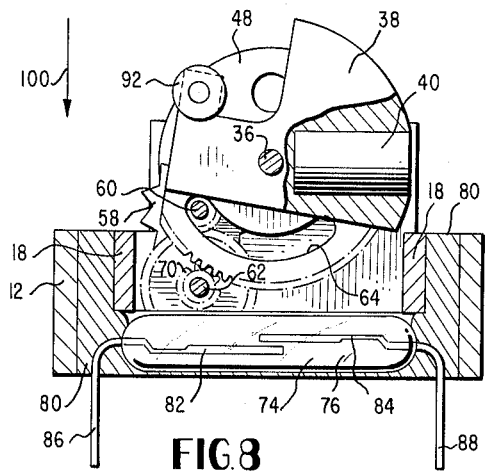
FIGURE 8 is a cross section taken along line 8—8 of FIGURE 3, showing the switch in its initial open position.

In operation, the rotor initially is set to the position illustrated in FIGURE 8 with the permanent magnet 40 approximately parallel to the top surface of the annular ring 12. The set-back mass 26 through the engagement of cam 94 with roller 92 acts to positively lock the rotor 38 against rotation. When the unit is subjected to acceleration forces in the direction of arrow 100 in FIGURE 8, the set-back mass is pushed downwardly to compress spring 32 so that it bottoms in guideway 24. This action of the set-back mass releases the rotor 38 so that it is free to rotate under the control of the run-away escapement subject to the same inertial forces that bottom the set-back mass.

When the set-back mass has moved to near its bottom position as illustrated in FIGURE 11, roller 92 disengages from cam surface 102, passes over the commit position 106, and passes above cam surface 104. Roller 92 is illustrated in FIGURE 11 as passing over the peak and thus committing the switch to close. This is accomplished by the fact that once the roller passes the peak 106 of the cam 94, the switch will subsequently close even if all acceleration forces are then immediately removed since the return action of spring 32 forces the set-back mass upwardly and the cam surface 104 drives the roller 92 and hence the rotor to the closed position illustrated in FIGURE 9.

Figure 9:
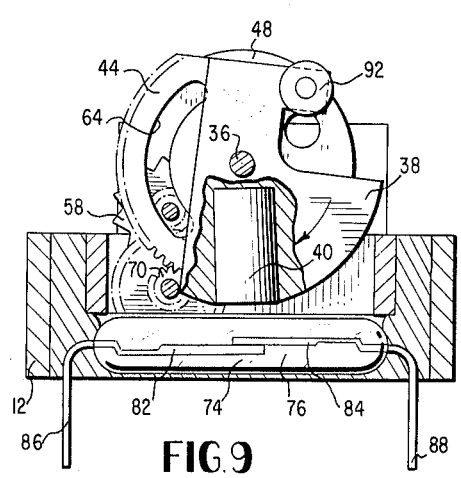
FIGURE 9 is a cross section similar to that of FIGURE 8 showing the switch moved to the closed position.

Closure of the reed contacts 82 and 84 occurs as the permanent magnet approaches the position illustrated in FIGURE 9 so that the contacts come under the influence of the magnetic field from the magnet which causes the contacts to polarize and close thus completing the circuit through leads 86 and 88. If the acceleration forces are not great enough or do not last long enough for the roller 92 to clear the peak 106 of the cam, upon return of the set-back mass to its uppermost position illustrated in FIGURE 7, the cam surface 102 will act to drive the roller and hence rotor 38 back to its initial rest position as illustrated in FIGURE 10. Hence the $g$-second product necessary to commit the switch to closure may be readily varied by simple modification of the size and shape of the cam surface 94 on the set-back mass.

It is apparent from the above that the present invention provides a novel small inertial switch of relatively simplified and rugged construction which is particularly suited to the monitoring of acceleration forces. Important features of the present invention include the provision of a permanent magnet embedded in the non-magnetic material of the rotor so that the switching function, that is, the closure of the reed switch, places little or no load on the rotor since the rotor and switch are not physically connected. Instead, switch closure is accomplished by the magnetic field of the permanent magnet. The radial position of the permanent magnet 40 with respect to the rotational axis of the rotor helps to substantially diminish any loading of the rotor and escapement by the physical action of the switch closing.

A further important feature of the present invention is the provision of a commit cam construction for the rotor whereby the $g$-second product necessary to commit the switch to closure may be very accurately determined by the shape and configuration of the cam. Variations in the $g$-second product producing switch closure can be very simply effected by simply modifying the cam 94 accordingly. In one embodiment constructed in accordance with the present invention the inertial switch had a $g$-second rating of 25 $g$-seconds. However, the $g$-second product necessary to effect switch closure may be substantially varied from this value and for example may vary from 5 $g$-seconds to 40 $g$-seconds. The device is usable with acceleration forces from 5-$g$'s to 160-$g$'s and the pull-in range of the set-back mass determined primarily by the spring 32 may be in the order of from 3-$g$'s to 140-$g$'s. The embodiment described above had an overall weight of 1.2 ounces and an overall volume of 0.6 cubic inch.

While the preferred embodiment illustrates only a single reed switch, it is apparent that the device of the present invention readily lends itself to sequential switch closure whereby a plurality of reed switches can be placed adjacent the path of movement of the permanent magnet 40 so that the permanent magnet acts to sequentially actuate the switches as it rotates with the rotor 38 under the influence of the run-away escapement. The unit is readily adapted for use in projectile and rocket fuzes but is particularly suited for use in monitoring rocket boost phenomena and also in transportation for monitoring the maximum $g$-second product to which a device has been subjected while being transported from one location to another.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An inertial device comprising a mass movable in response to acceleration forces, escapement means including a rotatably mounted pallet coupled to said mass for controlling its movement, electrical switch means adjacent said mass, and magnetic means coupled to said mass for activating said switch means upon a predetermined movement of said mass.

2. An inertial device comprising an eccentric mass rotatable in response to acceleration forces, a run-away escapement coupled to said mass for controlling its movement, a reed switch adjacent said mass, and permanent magnet means coupled to said mass for activating said switch upon a predetermined rotation of said mass.

3. A device according to claim 2 wherein said permanent magnet means comprises a permanent magnet carried by said mass, said reed switch being positioned adjacent the path of movement of said permanent magnet.

4. A device according to claim 3 wherein said mass is made of non-magnetic material and said permanent magnet is embedded in said mass.

5. An inertial device comprising a rotor movable in response to acceleration forces, a run-away escapement coupled to said rotor for controlling its movement, a set-back mass coupled to said rotor and locking said rotor against movement until said acceleration forces exceed a predetermined amount, an electrical switch adjacent said rotor, and magnetic means carried by said rotor for actuating said switch upon a predetermined rotation of said rotor.

6. An inertial device comprising a non-magnetic eccentric rotor mounted for rotation in response to acceleration forces, a run-away escapement, gear means coupling said rotor and escapement whereby the movement of said rotor is controlled by said escapement, a permanent magnet embedded in said rotor, a spring biased set-back mass coupled to said rotor for locking said rotor until said acceleration forces exceed a predetermined amount, and a reed switch positioned adjacent the path of movement of said permanent magnet.

7. A device according to claim 6 wherein said rotor is provided with a cam follower, said set-back mass having a cam engaged by said follower and shaped to urge said rotor in either of two directions of rotation.

8. An inertial device comprising a non-magnetic eccentric rotor mounted for rotation from a rest position to a switch position in response to acceleration forces, a run-away escapement coupled to said rotor for controlling the rotation of said rotor, a permanent magnet carried by said rotor, a reed switch positioned to intercept flux from said permanent magnet when said rotor is in said switch position, a cam follower on said rotor, a spring biased set-back mass coupled to said rotor for locking said rotor against rotation until said acceleration forces exceed the spring bias on said mass, and a cam on said mass engaged by said roller, said cam having a first inclined surface acting to urge said rotor toward said rest position and a second inclined surface acting to urge said rotor toward said switch position.

9. An inertial device comprising a non-magnetic chassis, a shaft supported by said chassis, a non-magnetic eccentric rotor rotatably mounted on said shaft and carrying a permanent magnet, said rotor being movable through an arc of less than 180° from a rest position to a switch position in response to acceleration forces, a drive rack mounted on said rotor, gear means coupling said drive rack to an escape wheel, a pallet mounted for oscillation on said shaft and carrying a pair of pallet pins engaged by said escape wheel, and a reed switch embedded in said chassis to intercept the flux from said permanent magnet when said rotor is in said switch position.

10. A device according to claim 9 wherein said reed switch is secured in a slot in said chassis by epoxy resin.

11. An inertial device comprising an annular non-magnetic housing, a non-magnetic chassis in said housing comprising a pair of end blocks and an intermediate support plate, a shaft supported between said plate and one of said end blocks, a non-magnetic eccentric rotor rotatably mounted on said shaft and carrying a permanent magnet, said rotor being movable through an arc of less than 180° from a rest position to a switch position in response to acceleration forces, a drive rack mounted on said rotor, gear means coupling said drive rack to an escape wheel, a pallet mounted for oscillation on said shaft and carrying a pair of pallet pins engaged by said escape wheel, and a reed switch embedded in said chassis to intercept the flux from said permanent magnet when said rotor is in said switch position, the other of said end blocks and said support plate defining a guideway, a set-back mass slidable in said guideway, a cam follower carried by said rotor, a cam on said set-back mass engaged by said follower, and spring means urging said set-back mass into a position at one end of said guideway whereby said rotor is locked against rotation by said cam, said cam having a commit portion whereby said rotor is urged in opposite directions when said follower engages said cam on opposite sides of said commit portion.

12. A device according to claim 11 wherein said rotor rotates through an arc of approximately 90°.

13. A device according to claim 12 wherein said rotor and chassis are made of brass and said housing of aluminum.

14. A device according to claim 12 wherein said permanent magnet is cobalt-platinum.

15. An inertial device comprising a non-magnetic chassis, a shaft supported by said chassis, a non-magnetic eccentric rotor rotatably mounted on said shaft and carrying a permanent magnet, said rotor being movable through an arc of less than 180° from a rest position to a switch position in response to acceleration forces, a drive rack mounted on said rotor, gear means coupling said drive rack to an escape wheel, a pallet mounted for oscillation on said shaft and carrying a pair of pallet pins engaged by said escape wheel, said permanent magnet being cylindrical and embedded in said rotor with its flux perpendicular to said shaft, and a reed switch embedded in said chassis to intercept the flux from said permanent magnet when said rotor is in said switch position.

16. A device according to claim 15 including a guideway, a set-back mass slidable in said guideway, a cam follower carried by said rotor, a cam on said set-back mass engaged by said follower, and spring means urging said setback mass into a position at one end of said guideway whereby said rotor is locked against rotation by said cam, said cam having a commit portion whereby said rotor is urged in opposite directions when said follower engages said cam on opposite sides of said commit portion.

References Cited by the Examiner

UNITED STATES PATENTS

| | | | |
|---|---|---|---|
| 2,698,657 | 1/1955 | Blomgren | 200—61.45 |
| 2,912,933 | 11/1959 | Rabinow | 200—61.45 |
| 2,915,604 | 12/1959 | Rabinow et al. | 200—61.45 |
| 2,976,378 | 3/1961 | Goddard | 200—61.45 |
| 3,008,018 | 11/1961 | Hammond | 200—61.53 |

BERNARD A. GELHEANY, *Primary Examiner.*

ROBERT K. SCHAEFER, *Examiner.*